United States Patent
Ono et al.

(10) Patent No.: US 6,625,806 B1
(45) Date of Patent: Sep. 23, 2003

(54) LANGUAGE PROCESSING METHOD AND LANGUAGE PROCESSING SYSTEM IMPROVING USE EFFICIENCY OF CACHE MEMORY

(75) Inventors: Rika Ono, Tokyo (JP); Takayuki Miura, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 0 days.

(21) Appl. No.: 09/237,254

(22) Filed: Jan. 26, 1999

(30) Foreign Application Priority Data

Jan. 26, 1998 (JP) .......................................... 10-012695

(51) Int. Cl.[7] ................................................ G06F 9/45
(52) U.S. Cl. ...................... 717/136; 717/136; 717/140; 717/157
(58) Field of Search ................................. 717/136, 131, 717/137, 143, 126, 127, 140, 141, 151, 155, 158; 711/3, 113, 111, 140

(56) References Cited

U.S. PATENT DOCUMENTS

| | | | | |
|---|---|---|---|---|
| 4,853,872 A | * | 8/1989 | Shimoi | 717/149 |
| 5,590,329 A | * | 12/1996 | Goodnow et al. | 717/144 |
| 5,696,974 A | * | 12/1997 | Agrawal et al. | 717/152 |
| 5,845,125 A | * | 12/1998 | Nishimura et al. | 717/129 |
| 5,854,924 A | * | 12/1998 | Rickel et al. | 717/132 |
| 5,881,151 A | * | 3/1999 | Yamamoto | 713/200 |
| 5,933,637 A | * | 8/1999 | Hurley et al. | 717/107 |
| 5,978,586 A | * | 11/1999 | Baisley et al. | 717/158 |
| 6,002,875 A | * | 12/1999 | Stolberg | 717/153 |
| 6,079,032 A | * | 6/2000 | Peri | 714/38 |
| 6,149,318 A | * | 11/2000 | Chase et al. | 717/131 |
| 6,161,216 A | * | 12/2000 | Shagam | 717/128 |
| 6,279,079 B1 | * | 8/2001 | Sakamoto | 711/133 |
| 6,279,091 B1 | * | 8/2001 | Kikuchi et al. | 711/170 |
| 6,282,707 B1 | * | 8/2001 | Isozaki | 717/157 |
| 6,473,896 B1 | * | 10/2002 | Hicken et al. | 717/132 |

FOREIGN PATENT DOCUMENTS

| | | |
|---|---|---|
| JP | 5-324281 | 12/1993 |
| JP | 7-84799 | 3/1995 |
| JP | 8-328870 | 12/1996 |

OTHER PUBLICATIONS

Hwu et al., Inline Function for compiling C programs, ACM pp 246–257, 1989.*

Grant et al., Annotation directed run time specialization in C, ACM PEPM, pp 163–178, 1997.*

Ghiya et al., On the importance of points to analysis and other memory disambiguation methods for C programs, ACM PLDI, pp 47–58, 2001.*

A.H. Hashemi et al., "Efficient Procedure Mapping using Cache Line Coloring", WRL Research Report 96/3, Oct. 1996, pp. 1–30.

* cited by examiner

Primary Examiner—Anil Khatri
(74) Attorney, Agent, or Firm—Foley & Lardner (57) ABSTRACT

In the translation of a source program to an object program, callee side functions that overlap in cache memory and are called by the same caller side function are detected, and all but one of the overlapping callee side functions called by a given caller side function are replaced with a replica of the original callee side function that will be stored in the cache in a non-overlapping position. The resulting set of callee side functions called by the caller side function are non-overlapping when stored in the cache, and thus the thrashing problem is avoided. This procedure may be repeated a predetermined number of times, or until all instances of overlap have been eliminated through the use of replicated callee side functions.

16 Claims, 6 Drawing Sheets

FUNCTION CALL GRAPH 31

FIG. 3A

FUNCTION SIZE TABLE 32

| FUNCTION | NUMBER OF OCCUPIED CACHE BLOCKS |
|---|---|
| M | 20 |
| A | 100 |
| B | 100 |
| addf | 5 |
| mulf | 10 |

FIG. 3B

FUNCTION ARRANGEMENT INFORMATION 24

| FUNCTION | SOURCE FILE | ARRANGEMENT ADDRESS |
|---|---|---|
| A | file2,c | 0xfe001000 |
| addf | addf,s | 0xfe001c80 |
| M | file1,c | 0xfe001d20 |
| B | file2,c | 0xfe002000 |
| mulf | mulf,s | 0xfe002c80 |

FIG. 4

LINK COMMAND INFORMATION 25

| ARRANGEMENT ADDRESS | FUNCTION NAME | OBJECT FILE NAME |
|---|---|---|
| V0xfe001000 | A | [file2,o]; |
| V0xfe001c80 | addf | [addf,o]; |
| V0xfe001d20 | M | [file1,o]; |
| V0xfe002000 | B | [file2,o]; |
| V0xfe002c80 | mulf | [mulf,o]; |
| V0xfe002e80 | addf2 | [addf2,o]; |

LANGUAGE PROCESSING METHOD AND LANGUAGE PROCESSING SYSTEM IMPROVING USE EFFICIENCY OF CACHE MEMORY

BACKGROUND OF THE INVENTION

1. Field of the Invention

The present invention relates generally to a language processing of a computer. More particularly, the invention relates to a language processing method and a language processing system for improving use efficiency of a cache memory.

2. Description of the Related Art

It is a typical method of speeding up a computer to reduce the frequency of access to program memory (hereinafter simply referred to as "memory") by holding data in a cache memory (hereinafter simply referred to as "cache"). However, since the cache memory has a limited capacity, it is not possible to hold all data in the cache. Therefore, it is possible for a miss-hit (cache miss) to occur due to access contention of the cache memory.

On the other hand, in the recent years, due to improvements in the computing speed of microprocessors, it frequently occurs that memory access becomes a bottle neck in improvement of operation speed of the computer. Therefore, it is necessary to reduce the number of times that memory is accessed by avoiding cache miss as much as possible.

For avoiding cache miss, there has been known a memory access optimizing method to schedule codes in descending order of the number that they are called. Scheduling is done during compiling of a source (prime) program written in a programming language, such as FORTRAN, COBOL, C language or assembly language or the like, into an object program to be executed in the computer having cache memory. Examples are found in Japanese Unexamined Patent Publication No. Heisei 5-324281, Japanese Unexamined Patent Publication No. Heisei 7-84799, and Japanese Unexamined Patent Publication No. Heisei 8-328870.

Furthermore, as a method for improving the use of memory through scheduling of codes by the compiler in order to enhance the use efficiency of an instruction cache memory, an algorithm for determining an arrangement of functions that takes into consideration call relationships between functions (sub-routines) is disclosed in A. H. Hashemi, D. R. Kaeli, B. Calder, "Efficient Procedure Mapping Using Cache Line Coloring", ACM SIGPLAN, 1997.

In the above-identified report, a direct mapping system, in which lower bits of an address of a memory block directly correspond to an address of a cache block where the memory block is mapped, has been discussed. However, this algorithm is easily applicable even in the case of a set associative system, in which entries of cache blocks equal to associative degree is determined by a lower bit of on address of the memory block. In this algorithm, as function call information, a function call graph, having a weight indicative of the number of times the function is called, and information of the code side per function, are input. The function call information includes profile information collected by executing a program and information obtained from a result of static analysis of the call relationship of the functions in the source program.

Then, the functions are divided into a group having high utilization and a group having low utilization. Concerning the group having high utilization, arrangement is determined in sequential order from functions on both ends of the side having the largest weight in the function call graph. Upon determining an arrangement, coloring (virtual indicator marking) is performed for the cache blocks occupied by respective functions to avoid conflict in the cache memory. In such arrangement, gaps in the cache memory where data is not written are filled by the functions having low utilization.

However, in the function arrangement system by coloring disclosed in the report, pairs of caller side functions/callee side functions (caller/callee) are arranged in the memory in descending order based on the number of times each function is called. Therefore, if there are functions that are called at high frequency by a large number of functions, an arrangement in which a conflict of such functions is caused in the cache block can occur.

For example, in the case of a processor having no floating point instruction, the compiler provides functions for conversion using arithmetical operations or an integer type floating point library and enables use of such by generating codes that call library functions for floating point operations in a user program. Such library functions are referred to as runtime routines, have relatively smaller size than normal library functions, and are called from many functions at particularly high frequency.

However, in the conventional compiler device, such runtime routines are arranged in on the memory together with general functions in descending order from the one having the largest number of calls with respect to the pairs of caller side functions/callee side functions. Therefore, if there are a plurality of functions calling the same runtime routine at a high frequency, an arrangement where a plurality of runtime routines causes conflict on the cache memory may occur.

Figure 7A:
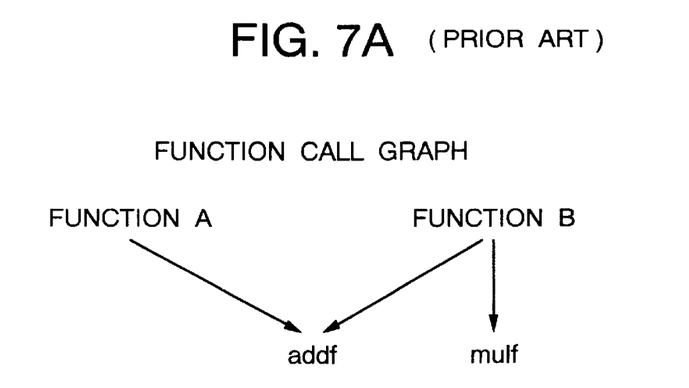
FIGS. 7A and 7B are explanatory illustrations of the conventional function arrangement method.
Figure 7B:
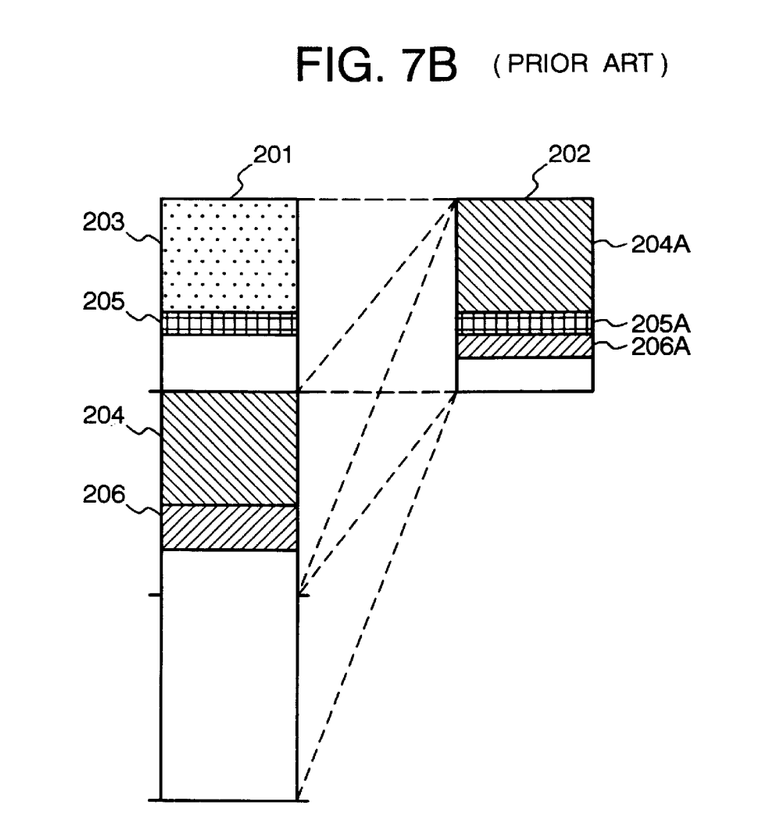

FIGS. 7A and 7B are explanatory illustrations of the conventional function arrangement method for discussing occurrence of conflict of the runtime routines on the cache memory.

Here, it is assumed that a call relationship between a function A, a function B, a runtime routine addf and a runtime routine mulf are as shown in a function call graph of FIG. 7A. On the other hand, in a memory 201 storing a program, as shown in FIG. 7B, the runtime routine addf as identified by 205 is optimally arranged relative to the function A as identified by 203, and, in the similar manner, the runtime routine mulf as identified by 206 is optimally arranged relative to the function B as identified by 204. In this case, in order to perform a process relating to the function B, the function B as identified by 204A and the runtime routine mulf as identified by 206A are loaded to the cache memory 202 from the memory 201, and the runtime routine addf as identified by 205A is further loaded. However, the runtime routine addf and the runtime routine mulf have overlapping addresses in the cache memory, and so a conflict is caused.

Particularly, the arithmetical operation or so forth in the runtime routine is generally performed repeatedly in the function. Therefore, between the runtime routines conflicting in the cache memory, a condition in which counterpart runtime routines expel each other may occur. Such condition is referred to as "thrashing". The expelled function has to be loaded from the memory again, at next call. Therefore, if thrashing is caused, the execution speed of the program becomes significantly lower.

SUMMARY OF THE INVENTION

An object of the present invention is to provide a language processing method, a language processing unit and a storage medium recording a language processing program which can avoid occurrence of thrashing between runtime routines upon generation of an object program by translating a source program.

In accordance with a preferred embodiment of the invention, callee side functions that overlap in cache memory and are called by the same caller side function are detected, and all but one of the overlapping callee side functions called by a given caller side function are replaced with a replica of the original callee side function that will be stored in the cache in a non-overlapping position. The resulting set of callee side functions called by the caller side function are non-overlapping when stored in the cache, and thus the thrashing problem is avoided. This procedure may be repeated a predetermined number of times, or until all instances of overlap have been eliminated through the use of replicated callee side functions.

Other objects, features and advantages of the present invention will become clear from the detailed description given hereinafter.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
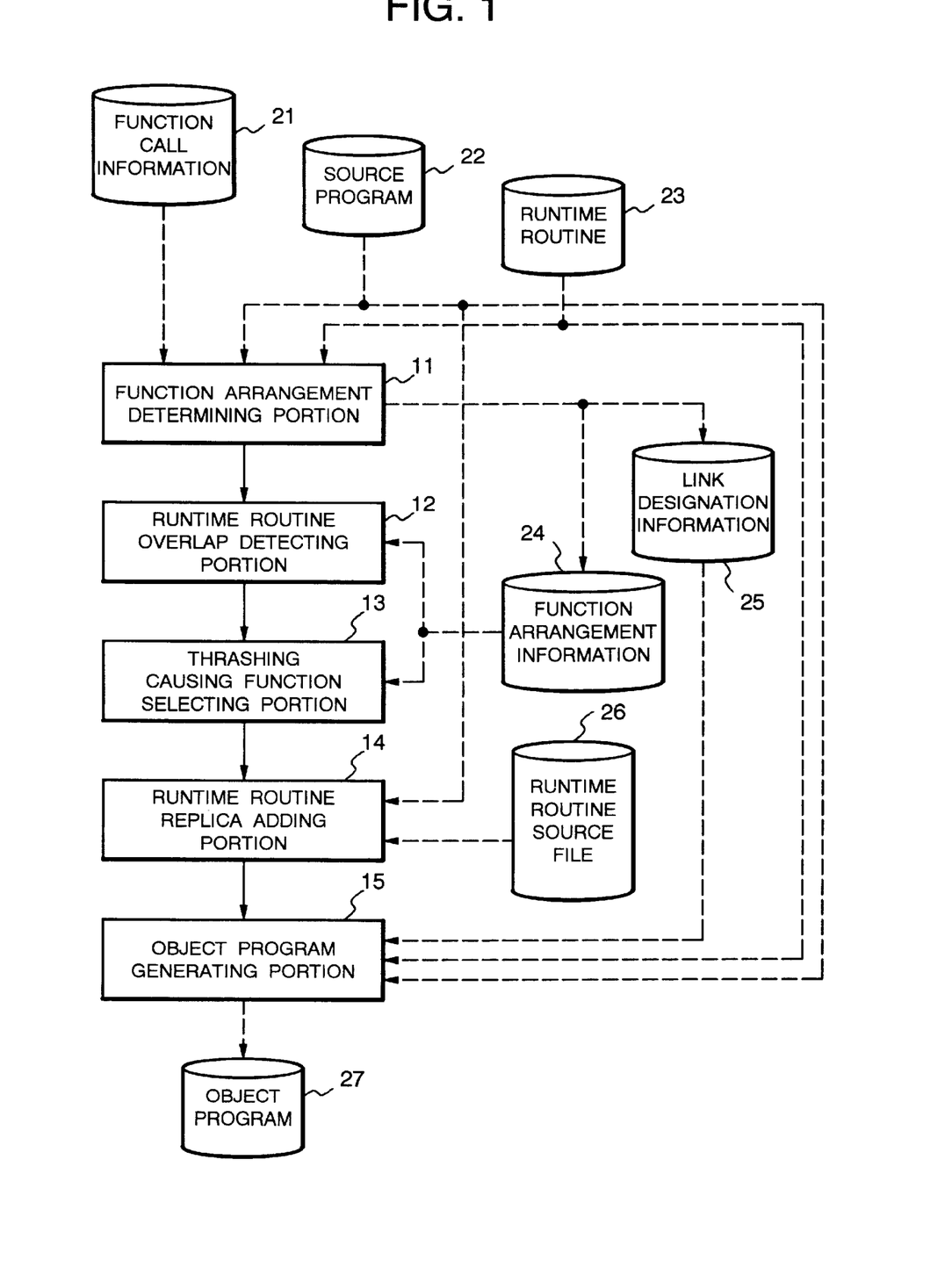
FIG. 1 is a block diagram showing a construction of one embodiment of a language processing system according to the present invention.

FIG. 1 is a block diagram showing a construction of the preferred embodiment of a language processing system according to the present invention.

The preferred embodiment of a language processing system (compiling processing system) is constructed with a function arrangement determining portion 11, a runtime routine overlap detecting portion 12, a thrashing causing function selecting portion 13, a runtime routine replica adding portion 14 and an object program generating portion 15.

The function arrangement determining portion 11 determines a function arrangement of a program according to a function arrangement determining method using function call information in a manner similar to the prior art. The function arrangement is updated in response to generation of a replica of a runtime routine.

The thrashing causing function selecting portion 13 selects functions that are called a number of times that is greater than or equal to a predetermined number, or that are called the most among functions in a relationship calling both of runtime routines, for which overlapping is detected by the runtime routine overlap detecting portion 12.

The runtime routine replica adding portion 14 calls the function selected by the thrashing causing function selecting portion 13, generates a replica of one of the runtime routines for which overlap is detected, calls the runtime routine from the function selected by the thrashing causing function selecting portion 13 and modifies the replica of the runtime routine generated.

The object program generating portion 15 generates an object program depending upon link designating information on the basis of updated function arrangement.

Referring to FIG. 1 to FIG. 5, operation of the shown embodiment of the language processing system (compiling processing system) will be discussed hereinafter.

The function arrangement determining portion 11 uses the function call information 21, makes reference to respective files of the source program 22 and the runtime routine 23, determines an arrangement of functions on the program in descending order of number of times of call (step S1 of FIG. 2), and outputs the function arrangement information 24 and the link designation information 25.

Figure 3A:
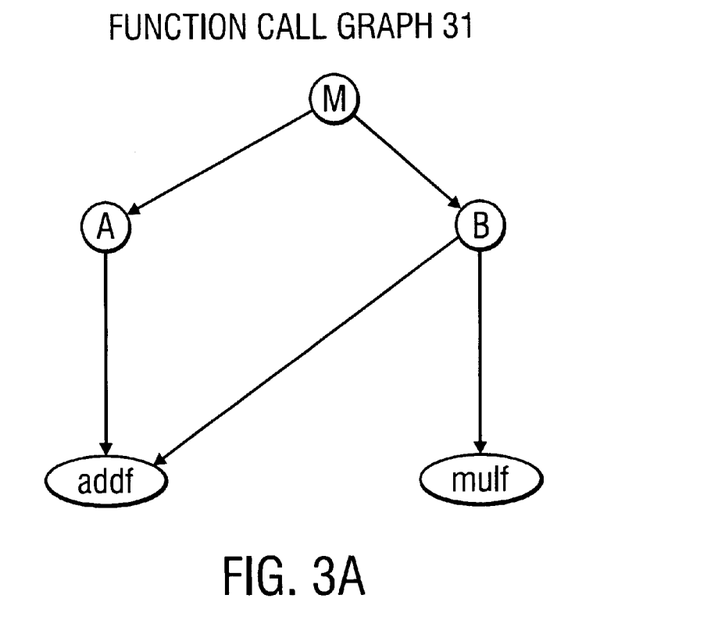
FIG. 3 is an explanatory illustration showing a function call information in the language processing system shown in FIG. 1.
Figure 3B:
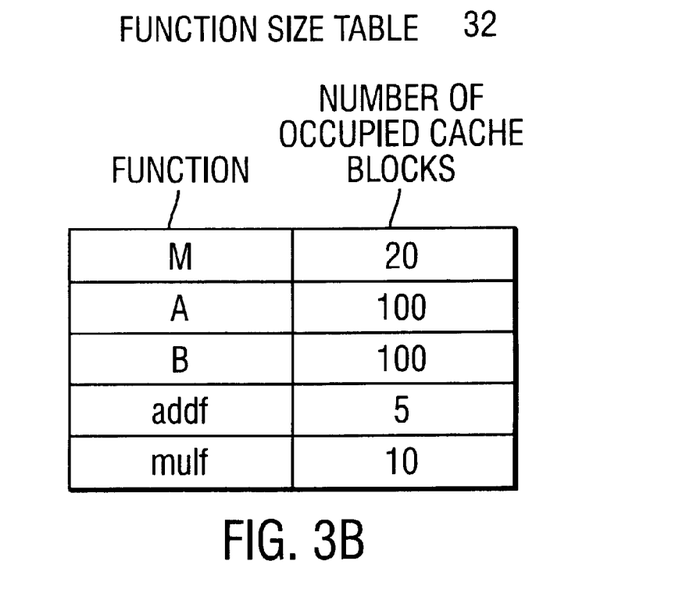

The function call information is consisted of a function call graph 31 shown in FIG. 3A, and a function size table 32 shown in FIG. 3B.

The function call graph 31 represents call relationships between functions and the number of times each is of called. For example, upon call of the function A and the function B, call of the function "addf" from the function A, and call of the functions "addf" and "mulf" from the function B, a mutual relationship between the functions is shown by "edge" and number of times of function call on the edge is shown as "weight".

On the other hand, the function size table 32 shows the number of blocks occupied by respective functions in the cache memory. In the shown embodiment, the capacity of the cache memory is 4 Kbytes, and each block consists of 32 bytes.

Figure 4:
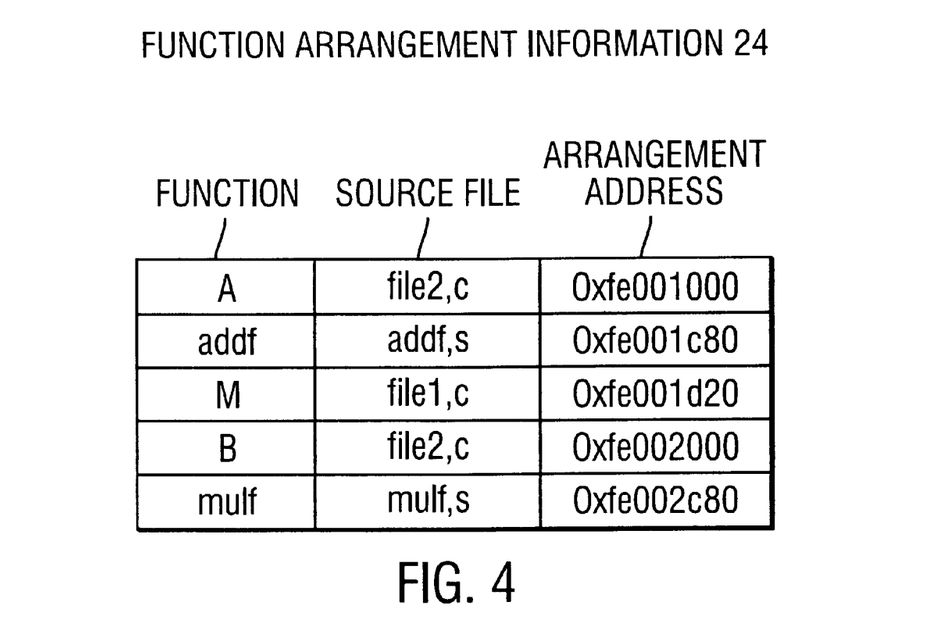
FIG. 4 is an explanatory illustration showing a function arrangement information in the language processing system shown in FIG. 1.

The function arrangement information 24 shows a correspondence of a source file name and an arrangement address (representative of start address) in the memory concerning respective functions arranged in the memory, as shown in FIG. 4. Here, "file1.c" and "file2.c" represent files in the source program 22, and "addf.s" and "mulf.s" represent files in the runtime routine 23.

Figure 5:
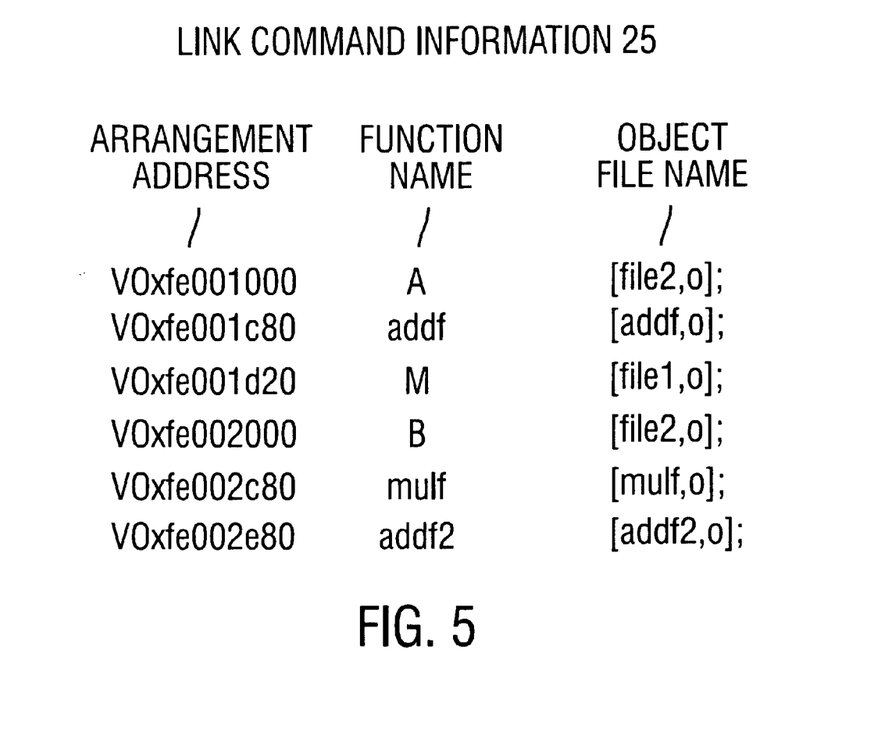
FIG. 5 is an explanatory illustration showing a link designation information in the language processing system shown in FIG. 1.

The link designation information shows an arrangement designation to be provided for generating an object program and shows a correspondence between a function name, an object file (file for generating the object program) name and an arrangement address in the memory.

Figure 2:
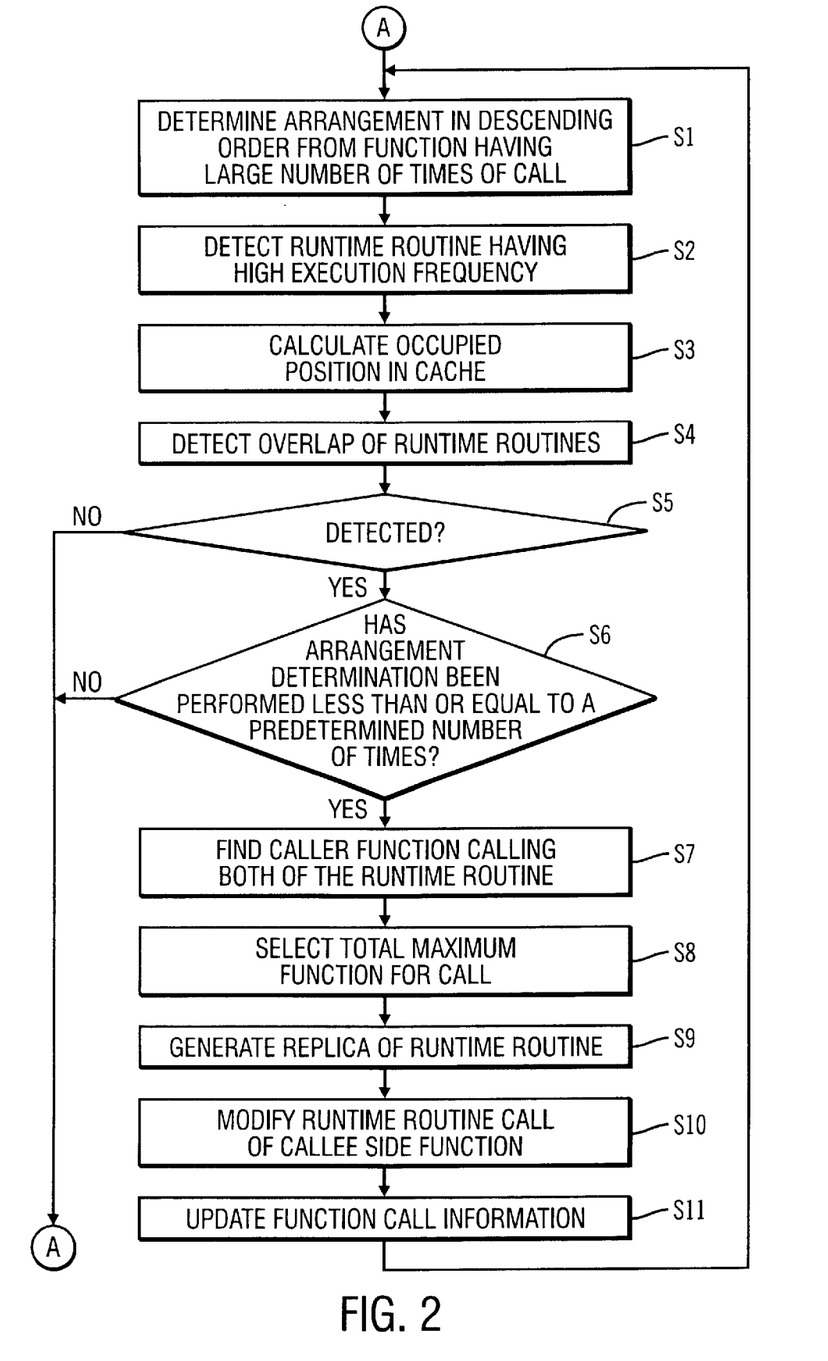
FIG. 2 is a flowchart showing a flow of process in one embodiment of the language processing system of FIG. 1.

The runtime routine overlap detecting portion 12 makes reference to the function arrangement information 24 to detect a runtime routine that is called at high frequency by a plurality of functions (step S2). Next, the arrangement of that runtime routine in the cache memory is checked by calculating an occupied position on the cache memory (step S3) to detect whether overlap of runtime routines in the cache memory is present or not (step S4).

In the direct map type cache memory, the occupied position of the function in the cache memory is a remainder of division of the function address in the memory by a cache size. Since loading of the function from the memory to the cache memory is performed per block, the question of whether runtime routines will overlap in the same cache block may be determined by whether a portion of the lower 12 bits of an address, excluding the lower 5 bits, are matched or not when the cache size is 4096 bytes and the block size is 32 bytes.

When overlap of the runtime routines is detected (step S5), judgment is made whether the number of times that arrangement determination has been performed is less than or equal to a predetermined number (step S6). When number of times that arrangement determination has been performed is less than or equal to the predetermined number of times, reference is made to the function call information 24 in the thrashing causing function selecting portion 13 to find a function that calls the overlapping runtime routines, such as "addf" and "mulf" (step S7). Then, among the such functions, the function having the greatest total of number of calls for the runtime routines addf and mulf (function B in this case) is selected (step S8).

The runtime routine replica adding portion 14 reads one of the runtime routines "addf" and "mulf", in which overlap is detected with respect to the selected function B, namely the runtime routine "addf" which is called from the function B fewer times than the runtime routine "mulf" as shown in FIG. 3A, for replication, to generate a runtime routine "addf2" (step S9) to add in the source program 22.

Then, the call of runtime routine "addf" from the function B is modified to call the replicated runtime routine "addf2" instead (step S10). Furthermore, in association with modification of the runtime routine to be called, the call of the runtime routine "addf" in the function call information 21 is updated to call of the runtime routine "addf2" instead (step S11).

It should be noted that, in place of generation of replica of the runtime routine "addf", a replica of the runtime routine "mulf" may be generated. However, in this case, the replicated runtime routine "mulf" has to be arranged at a position on the cache memory different from that before replication so as not to overlap with the runtime routine "addf". Therefore, the process becomes complicated. Furthermore, use efficiency of the cache capacity can be lowered. Accordingly, in this case, the possibility of improvement of use efficiency of the cache memory may be higher by generating a replica of the runtime routine "addf" which is not optimally arranged with respect to the function B.

The foregoing procedure is performed repeatedly until overlap between the runtime routines on the cache memory disappears (step S5) or even when over lap of the runtime routine is detected, number of times of arrangement determination in the function arrangement determining portion 11 exceeds the predetermined number of times (step S6).

Finally, the object program generating portion 15 establishes a link of data of the source program 22 and the runtime routine 23 according to the link designation information to generate an object program 27.

Next, the function arrangement to be obtained by the shown embodiment of the language processing system will be discussed with reference to FIGS. 6A and 6B.

Figure 6A:
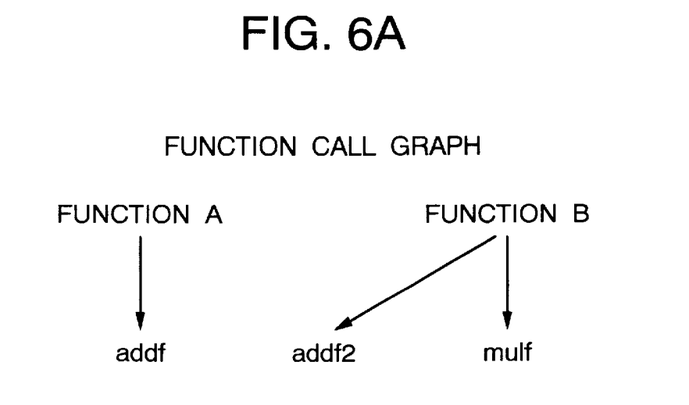
FIGS. 6A and 6B are illustrations exemplifying function arrangement obtained by the language processing system shown in FIG. 1.
Figure 6B:
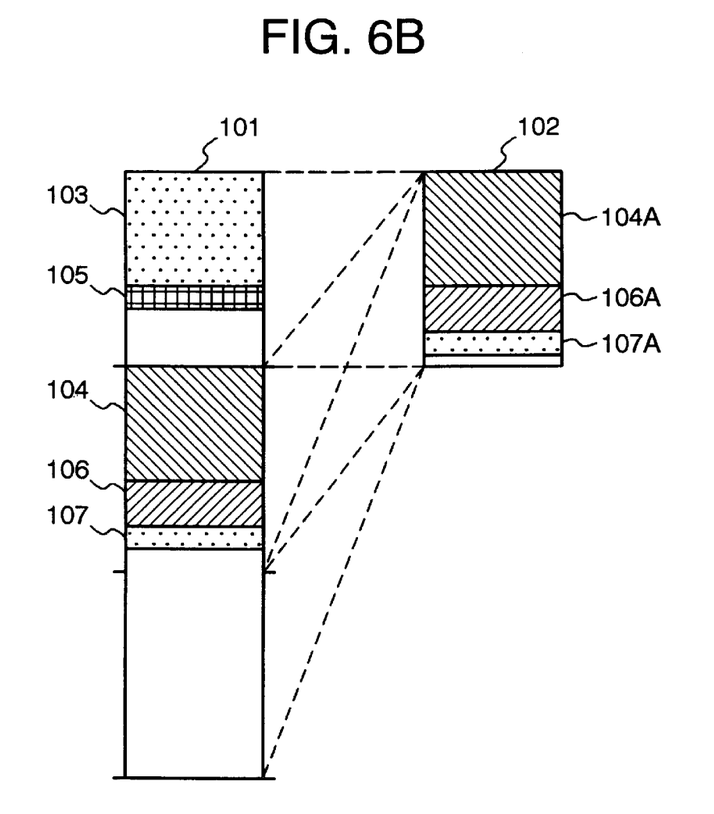

In the shown embodiment, call relationship between the function A, the function B, the runtime routine "addf", the replica "addf2" of the runtime routine, and the runtime routine "mulf" is as illustrated in a function call graph shown in FIG. 6A. On the other hand, in a memory 101 storing the program, the runtime routine "addf" identified by 105 is optimally arranged relative to the function A identified by 103, the runtime routine "mulf" identified by 106 is optimally arranged relative to the function B identified by 104, and the replica "addf2" of the runtime routine, identified by 107, is arranged relative to the function B.

In this case, in order to perform a process relating to the function B, the function B identified by 104A and the runtime routine "mulf" identified by 106A are loaded to the cache memory 102 from the memory 101. Also, the replica "addf2" of the runtime routine identified by 107A is loaded. Since the runtime routine "addf2" and the runtime routine "mulf" are not overlapped the address on the cache memory, conflict is not caused.

Thus, by the shown embodiment of language processing, occurrence of thrashing between the frequently executed runtime routines can be avoided. This reduces constraint relating to arrangement of runtime routines upon arranging with coloring by arranging replica of the runtime routine, distributing concentrated call to one runtime routine. By the process set forth above, probability of arranging the runtime routines without overlapping becomes high.

It should be noted that as a method for avoiding thrashing between the runtime routines, in the function arrangement determining process, upon determining arrangement of the function on the memory sequentially from both ends of the edge of the function call graph having large weight, it is theoretically possible to perform arrangement by finding positions not causing overlap in consideration of arrangement of the already arranged runtime routine. However, such method inherently makes overhead for arrangement determination significantly large.

On the other hand, it is easy to find functions on which thrashing between the runtime routines is caused from the result of arrangement according to the conventional algorithm. In the method of the present invention, since overlapping of the runtime routine that causes thrashing is directly removed, thrashing between runtime routines can be avoided with small overhead.

On the other hand, routines possible to be used in particularly high frequency as runtime routines, in general, are arithmetical operation of floating point type, namely, addition, subtraction, multiplication, division, comparison of floating point type number, mutual conversion between floating point type number of integral type number. The method according to the present invention is particularly preferred in the case when the runtime routine is one of the foregoing routine or combination thereof.

While the present invention has been discussed in detail in terms of the preferred embodiment with reference to the drawings, the present invention should not be limited to particular construction disclosed and illustrated and any modification of design or so forth implemented without departing apart from the principle of the present invention is encompassed within the scope of the present invention. For example, the present invention is useful in program development of a microcomputer built in system, in which use efficiency of cache memory is high. However, application of the present invention is not limited to the above-mentioned application but can be applicable for program generating in work station or other kind of computer. On the other hand, applicable language is not limited to the high level language but can be assembly language, machine language. The high level language is not only typical FORTRAN or C language, but also ALGOL, COBOL, PL/I, BASIC and any arbitrary one.

The preferred embodiment of the language processing system set forth above can be realized by program-controlled CPU and internal memory, such as RAM and so forth in the work station, personal computer and other computer system. A language processing program realizing the foregoing function is provided in a form stored in a general storage medium, such as magnetic disc, an optical disc, a semiconductor memory and so forth, and is loaded in the internal memory of the computer system for controlling CPU to realize the functions of respective components set forth above.

In the construction of the present invention, after determining the function arrangement of a source program, a callee side function called by a plurality of caller side functions at high frequency is detected. Then, it is determined whether the callee side function overlaps with other callee side functions in the cache memory. When overlapping callee side functions are detected, the caller side functions calling those callee side functions in common are retrieved. Among the functions retrieved, the one that calls those callee side functions the most is selected to have associated therewith a replica of one or more callee side functions, and function arrangement is determined again. Such procedure is repeated until conflict between the callee side functions in the cache memory can be avoided. Finally, the source program is linked to generate the object program. Therefore, in execution of the program, thrashing between the callee side functions which are called frequently can be avoided.

Namely, with the construction of the present invention, upon execution of the program run on the computer using the cache memory, an arrangement of functions can be determined so that thrashing between callee side functions frequently called on the cache memory can be reduced. Also, increasing of overhead for determining function arrangement can be restricted.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A method for producing a computer readable medium having stored therein an object program for execution on a computer that includes a cache, comprising:
    a step of detecting a callee side function that is called by a plurality of caller side functions of said source program, and detecting other callee side functions that will overlap said callee side function when stored in a cache;
    a step of selecting a caller side function that calls overlapping callee side functions at least a predetermined frequency;
    a step of replacing all but one of overlapping callee side functions called by a caller side function with replicas of the original all but one callee side functions, and rearranging said replicas so as to have non-overlapping positions when stored in said cache;
    repeating said steps until the occurrence of one of:
        overlapping of said callee side functions being no longer detected, and
        performance of said steps more than a predetermined number of times; and
    storing in a computer readable medium an object program translated from said source program and including said replicas of original callee side functions.

2. A method as set forth in claim 1, wherein, in said selection step, a caller side function having a highest frequency of calls for said callee side function among said plurality of caller side functions is selected.

3. A method as set forth in claim 1, wherein a callee side function arranged in non-optimal arrangement among overlapping callee side functions is replaced with said replica of the original callee side function.

4. A method as set forth in claim 1, wherein each of said callee side functions is a runtime routine.

5. A method as set forth in claim 1, wherein each of said callee side functions is a runtime routine, and each of said runtime routines is one of addition, subtraction, multiplication, division and comparison of a floating point type number, mutual conversion between a floating point type number and an integral type number, and a combination thereof.

6. A method as set forth in claim 1, wherein, in relation to said caller side function, a callee side function arranged in non-optimal arrangement among overlapping callee side functions is replaced with said replica of the original callee side function,
    each of said callee side functions is a runtime routine, and
    each of said runtime routines is one of addition, subtraction, multiplication, division and comparison of a floating point type number, mutual conversion between a floating point type number and an integral type number, and a combination thereof.

7. A machine for translating a source program into an object program to be executed on a computer having a cache memory, said machine including a computer readable medium storing programming instructions for performing said translating, said translating comprising:
    detecting a callee side function that is called by a plurality of caller side functions of said source program, and detecting other callee side functions that will overlap said callee side function when stored in a cache;
    selecting a caller side function that calls overlapping callee side functions at at least a predetermined frequency;
    replacing all but one of overlapping callee side functions called by a caller side function with replicas of the original all but one callee side functions, and rearranging said replicas so as to have non-overlapping positions when stored in said cache; and
    storing in a computer readable medium an object program translated from said source program and including said replicas of original callee side functions.

8. A machine as set forth in claim 7, wherein said translating further comprises repeating said determining, detecting, selecting and replacing until the occurrence of one of:

overlapping of said callee side functions being no longer detected, and performance of said steps more than a predetermined number of times.

9. A machine as set forth in claim 7, wherein a caller side function having a highest frequency of calls for said callee side function among said plurality of caller side functions is selected.

10. A machine as set forth in claim 7, wherein a callee side function arranged in a non-optimal arrangement among overlapping callee side functions is replaced with said replica of the original callee side function.

11. A machine as set forth in claim 7, wherein each of said callee side functions is a runtime routine.

12. A machine as set forth in claim 7, wherein each of said callee side functions is a runtime routine, and each of said runtime routines is one of addition, subtraction, multiplication, division and comparison of a floating point type number, mutual conversion between a floating point type number and an integral type number, and a combination thereof.

13. A computer readable medium storing a language processing program for translating a source program into an object program to be executed on a computer having a cache memory, said language processing program comprising:

a step of detecting a callee side function that is called by a plurality of caller side functions of said source program, and detecting other callee side functions that will overlap said callee side function when stored in a cache;

a step of selecting a caller side function that calls overlapping callee side functions at at least a predetermined frequency;

a step of replacing all but one of overlapping callee side functions called by a caller side function with replicas of the original all but one callee side functions, and rearranging said replicas so as to have non-overlapping positions when stored in said cache;

repeating said steps until the occurrence of one of:
overlapping of said callee side functions being no longer detected, and performance of said steps more than a predetermined number of times; and storing an object program translated from said source program and including said replicas of original callee side functions.

14. A computer readable medium as set forth in claim 13, wherein, in said selection step of said language processing program, a caller side function having a highest frequency of calls for said callee side function among said plurality of caller side functions is selected.

15. A computer readable medium as set forth in claim 13, wherein a callee side function arranged in non-optimal arrangement among overlapping callee side functions is replaced with said replica of the original callee side function.

16. A computer readable medium as set forth in claim 13, wherein each of said callee side functions is a runtime routine, and each of said runtime routines is one of addition, subtraction, multiplication, division and comparison of a floating point type number, mutual conversion between a floating point type number and an integral type number, and a combination thereof.

* * * * *